United States Patent [19]
Bernardi et al.

[11] 3,750,212
[45] Aug. 7, 1973

[54] VEHICLE WASHING INSTALLATION

[75] Inventors: Robert P. Bernardi; Donald A. Bernardi, both of Harrisburg, Pa.

[73] Assignee: Bernardi Brothers, Inc., Harrisburg, Pa.

[22] Filed: July 14, 1970

[21] Appl. No.: 54,750

[52] U.S. Cl. ............................. 15/21 D, 15/DIG. 2
[51] Int. Cl. ............................................. B60s 3/06
[58] Field of Search ..................... 15/DIG. 2, 21 D, 15/21 E, 53, 97

[56] References Cited
UNITED STATES PATENTS

| | | | |
|---|---|---|---|
| 3,332,098 | 7/1967 | Smith | 15/21 D |
| 3,443,270 | 5/1969 | Smith | 15/21 D |
| 3,456,275 | 7/1969 | Solomon | 15/21 D |
| 3,593,357 | 7/1971 | Oldham | 15/21 D |

OTHER PUBLICATIONS
Auto Laundry News; Oct. 1968; page 13.

*Primary Examiner*—Edward L. Roberts
*Attorney*—Anthony A. O'Brien

[57] ABSTRACT

A vehicle washing installation including a pair of longitudinally staggered rear brushes and a pair of longitudinally staggered front brushes which are operative to wash the rear end and sides and the front end and sides of a vehicle, respectively, with each rear brush being responsive to the position of one of the front brushes such that the rear brushes contact the vehicle along the front doors thereof to avoid interference with antennas.

7 Claims, 14 Drawing Figures

INVENTORS,
ROBERT P. BERNARDI
BY DONALD A. BERNARDI
Anthony A. O'Brien
ATTORNEY

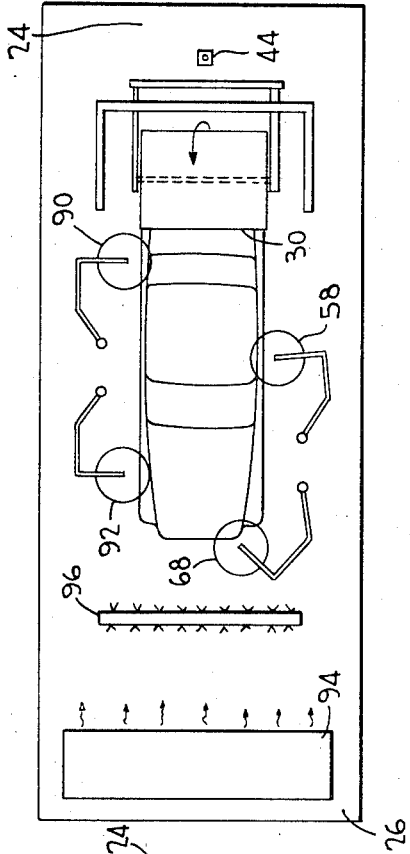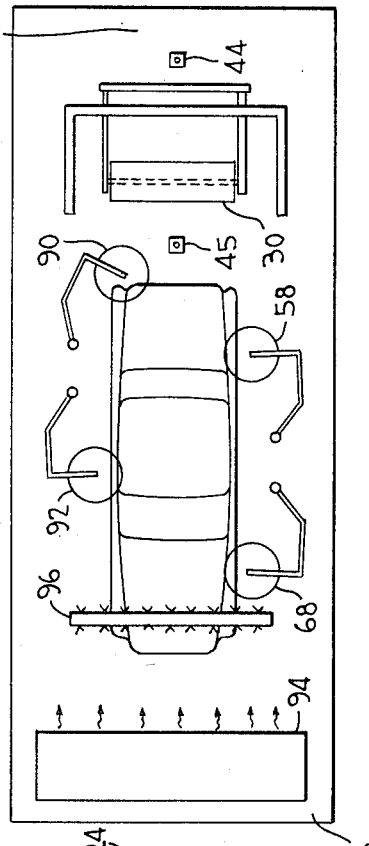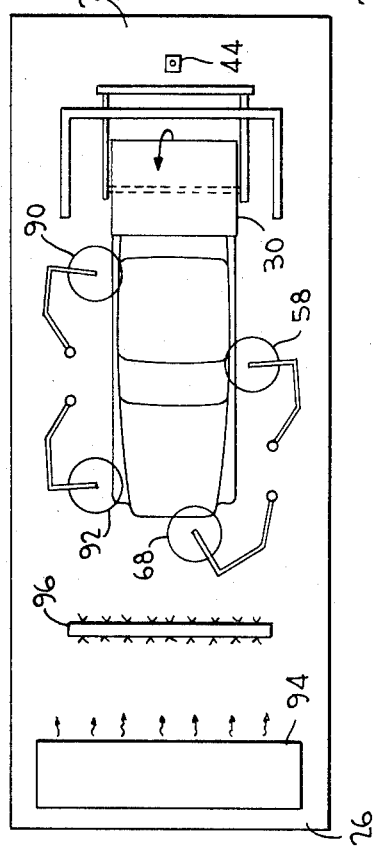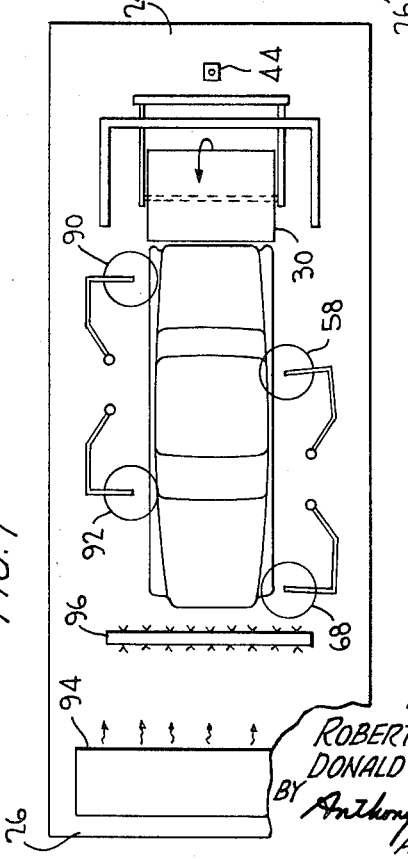

INVENTORS,
ROBERT P. BERNARDI
DONALD A. BERNARDI
BY Anthony A. O'Brien
ATTORNEY 3,750,212

VEHICLE WASHING INSTALLATION

BACKGROUND OF THE INVENTION

1. Field of the Invention

The present invention pertains to vehicle washing installations and more particularly to such installations wherein a vehicle is moved past a plurality of rotating brushes for automatic washing thereby.

2. Description of the Prior Art

Automated vehicle washing installations are presently in great demand due to their decreased operating expense; however, many such installations sacrifice thorough washing for automation. Most vehicle washing installations utilize rotating brushes supported on either side of the vehicle, and the front and rear ends of automobiles are very difficult to clean with such brushes due to their varied surfaces and projections and the fact that the brushes must move in a direction transverse to the sides of the automobile under pressure while washing the front and rear ends. Prior art attempts to overcome the above problems have the disadvantages of either leaving surfaces unwashed or of interfering or getting entangled with projections such as antennas.

Attempts to overcome the above problems have commonly included longitudinal staggering of the brushes on either side of the vehicle such that the front and rear ends are washed in overlapping fashion; however, such attempts have not adequately overcome the problem of antenna obstruction without the provision of cumbersome, costly arrangements which are commercially unacceptable. U.S. Pat. Nos. 3,000,025, 3,237,229, 3,332,098, and 3,443,270 are generally cognizant of the above mentioned problems and utilize staggered side brushes to provide overlapping washing of the front and rear ends of a vehicle.

SUMMARY OF THE INVENTION

The present invention is generally characterized in the combination in a vehicle washing installation of a pair of rear brushes pivotally supported on first and second sides of a path of travel for a vehicle to be washed, a pair of front brushes pivotally supported on the first and second sides of the path of travel, the rear brushes having park positions out of the path of travel and the front brushes having longitudinally juxtaposed park positions in the path of travel, and a control responsive to pivotal movement of one of the front brushes to actuate one of the rear brushes whereby the rear brush engages and washes only a portion of the side of the vehicle.

An object of the present invention is to arrange a pair of front brushes and a pair of rear brushes in a vehicle washing installation such that the front and rear brushes are longitudinally staggered to provide overlapping washing of the front and rear ends and the sides of a vehicle.

Another object of the present invention is to operate a larger rear brush in response to movement of a smaller front brush such that the rear brush engages and washes only a portion of the side of a vehicle.

Some of the advantages of the present invention over the prior art are that complete washing is provided by large brushes without interference with antennas, and that the front and rear ends of a vehicle are washed in overlapping fashion with simple and inexpensive apparatus.

Further objects and advantages of the present invention will become apparent from the description of the preferred embodiment as shown in the accompanying drawings.

BRIEF DESCRIPTION OF THE DRAWINGS

FIGS. 1–12 are schematic representations of various steps of washing a vehicle in a vehicle washing installation according to the present invention.

DESCRIPTION OF THE PREFERRED EMBODIMENT

Figure 13:
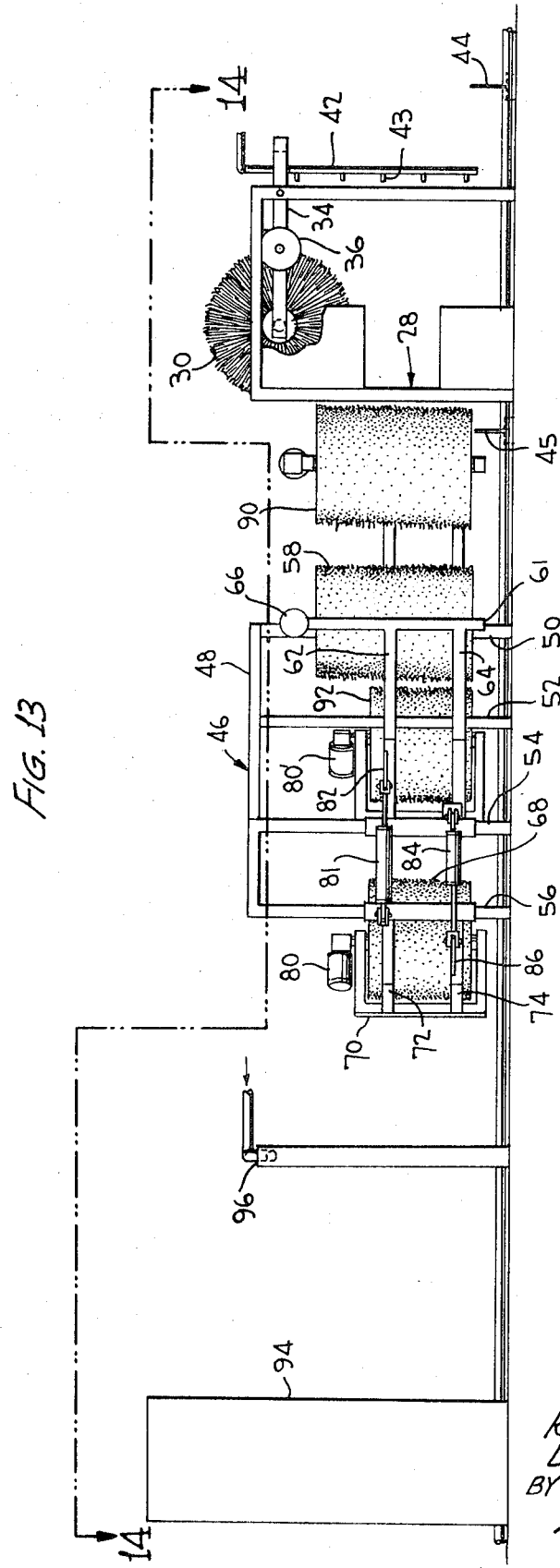
FIG. 13 is a side elevation of a vehicle washing installation according to the present invention.
Figure 14:
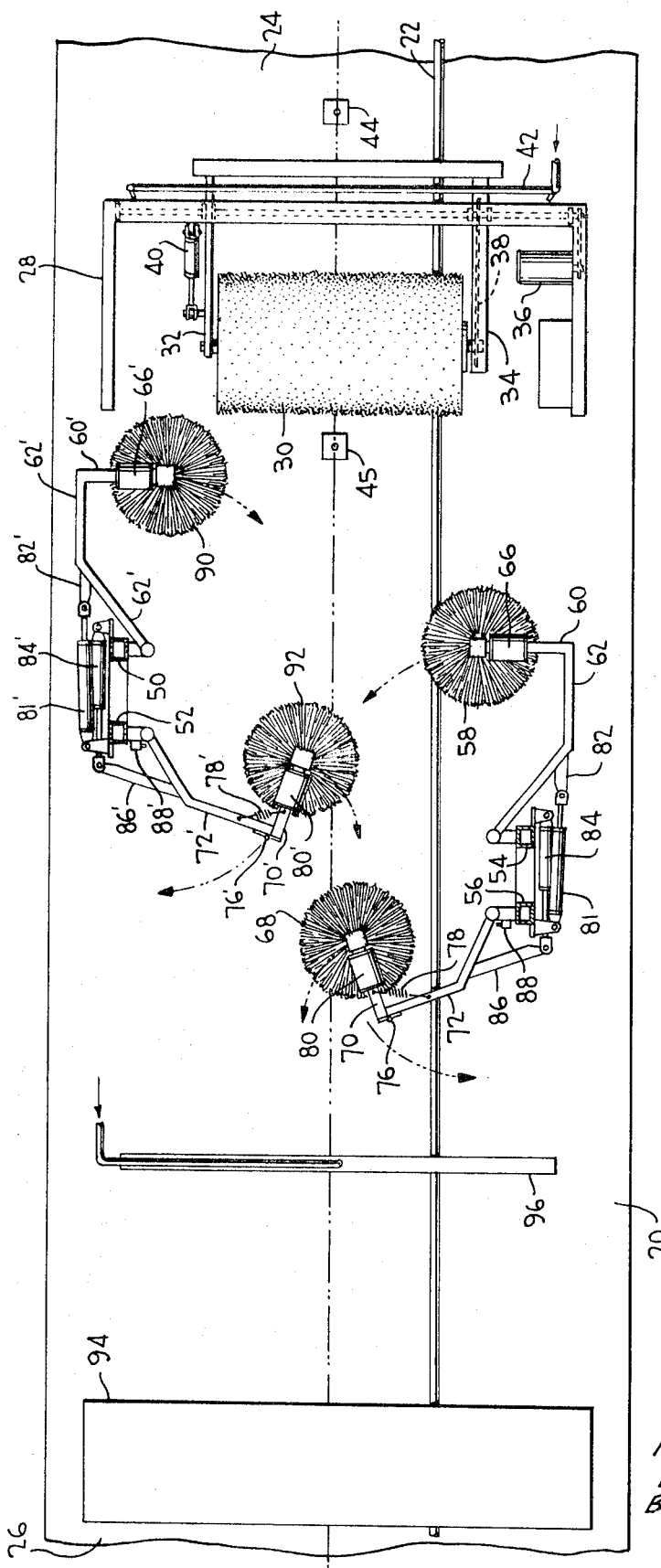
FIG. 14 is a sectional view taken along line 14—14 of FIG. 13.

A vehicle washing installation according to the present invention is illustrated in FIGS. 13 and 14 and includes a platform 20 defining a passageway through which a vehicle is to be moved and guided by means of a conveyor chain and tire guide rail 22 running longitudinally through the passageway. The passageway has an entrance 24 at the right hand end thereof and an exit 26 at the left hand end thereof, and it is understood that such conventional apparatus as a currency acceptor device and a tire sidewall cleaning apparatus may be positioned at entrance 24.

An inverted U-shaped frame 28 extends over the passageway at a position adjacent entrance 24, to support a top brush 30. Top brush 30 is of conventional construction and includes a horizontal shaft carrying a plurality of long fiber strands which are extended by centrifugal force when the shaft is rotated. The shaft is journaled through the ends of a pair of parallel arms 32 and 34 which extend from the top of frame 28 and are pivotable thereabout. The top brush 30 is rotated by means of a motor 36 which drives the top brush through a sprocket 38 extending along arm 34, and top brush 30 is pivoted about the top of frame 28 by means of an air cylinder 40 secured to the top of frame 28 and having a piston secured to arm 32. A wash arch 42 is supported on the entrance side of frame 28 and has a plurality of nozzles 43 disposed on both sides and the top thereof and adapted to spray water and detergent on the vehicle to be washed. A switch 44 is disposed on platform 20 in front of frame 28 to be actuated by a vehicle, and a switch 45 is similarly disposed behind frame 28.

An inverted U-shaped frame 46 is spaced from frame 28 and extends over the passageway at an angle to the longitudinal and lateral axes of the vehicle washing installation. That is, frame 46 includes a pair of top members 48 extending diagonally across the passageway between side columns which include pairs of upright side members 50, 52 and 54, 56 such that side members 50, 52 are closer to frame 28 than are side members 54, 56. A rear brush 58 has a vertical shaft journaled through the ends of offset support arms 60 and 61 which are rigidly connected to two parallel horizontal members 62 and 64 pivotally mounted on side member 54. A motor 66 is mounted on support arm 60 to rotate brush 58 counterclockwise, looking at FIG. 14, when energized. A front brush 68 has a vertical shaft journaled through the ends of a support arm clevis 70 which is rotatably connected to two parallel horizontal members 72 and 74 by means of hinges 76, and members 72 and 74 are pivotally mounted on side member 56. A tension spring 78 is mounted between clevis 70 and member 72 to tend to keep clevis 70 at a right angle with respect to members 72 and 74. A motor 80 is mounted on the top arm of clevis 70 to rotate front brush 68 counterclockwise, looking at FIG. 14, when energized.

The pivotal movement of rear brush 58 is controlled by an air cylinder 81 which is attached to side member 56 and has a piston operatively connected with a wing-like extension 82 extending from horizontal member 62. Similarly, the pivotal movement of front brush 68 is controlled by an air cylinder 84 which is attached to side member 54 and has a piston operatively connected with a wing-like extension 86 extending from horizontal member 74. A microswitch 88 is mounted on side member 56 adjacent horizontal member 72 such that switch 88 is actuated by pivotal movement of front brush 68.

A rear brush 90 and a front brush 92 are mounted on side members 50 and 52 in the same manner as previously described with respect to brushes 58 68; and similar mounting and control structures for brushes 90 and 92 are given primed reference numerals and are not described again. Motors 66' and 80' are operative to rotate brushes 90 and 92 in a clockwise direction, looking at FIG. 14.

A dryer 94, through which a washed vehicle passes, is disposed over the passageway adjacent exit 26, and a rinsing and waxing arch 96 is mounted on a frame between front brush 68 and dryer 94.

Front brushes 68 and 92 have park or initial positions directly in the path of travel of a vehicle through the installation, and due to the longitudinally staggered positioning of support structure on either side of the path of travel, front brushes 68 and 92 are longitudinally juxtaposed in their park positions with the axis of each vertical shaft being slightly off center. It will be appreciated that rear brushes 58 and 90 are also longitudinally staggered and have park positions out of the path of travel. Brushes 58, 68, 90 and 92 are all of conventional structure and include a plurality of long fiber strands extending from the vertical shafts such that the strands are extended by centrifugal force when the shafts are rotated. Rear brushes 68 and 92 have a larger vertical dimension than front brushes 58 and 90 in order to completely wash the sides of a vehicle.

The operation of the vehicle washing installation will be described with reference to FIGS. 1 through 12 which schematically illustrate the various operational steps involved in the washing of a vehicle. As previously mentioned, in order to fully automate the installation, a currency acceptor device may be positioned adjacent entrance 24 such that the installation is not operative unless the correct amount of money has been deposited therein. Once the correct amount of money is deposited, the vehicle is driven into the passageway and is engaged by the conveyer for movement through the installation at a predetermined speed and without the need for a driver.

Figure 1:
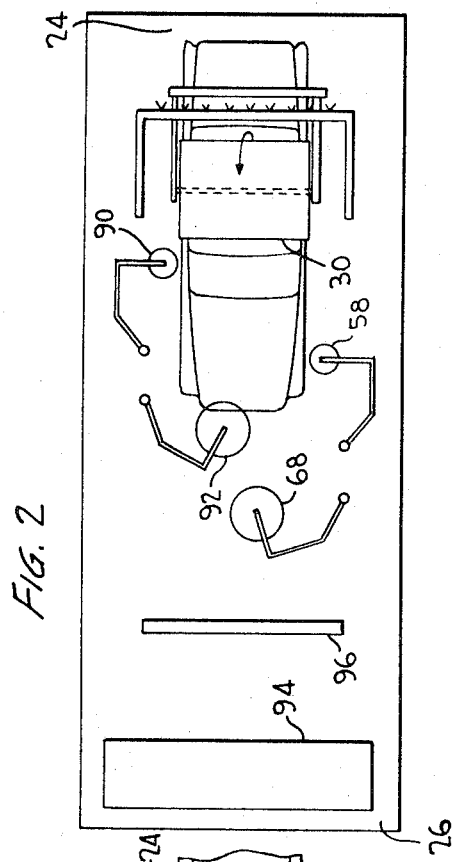

The initial state of the brushes in the installation prior to the entrance of the vehicle is illustrated in FIG. 1. Top brush 30 is in its park position retracted to the level of the top of frame 28. Front brushes 68 and 92 are in their park positions in the path of travel with their axes adjacent the longitudinal center of the passageway, and rear brushes 58 and 90 are in their park positions out of the path of travel. None of the brushes are rotating at this time, and no spray is emanating from either wash arch 42 or rinsing and waxing arch 96. Similarly, the blower in dryer 94 is not energized, and no air is being blown through the dryer.

As the vehicle approaches frame 28, switch 44 is actuated to supply wash water and detergent to arch 42 and to actuate motor 36 and cylinder 40 to bring top brush 30 into rotating contact with the hood of the vehicle. Actuation of switch 44 also starts motors 80 and 80' to rotate front brushes 68 and 92, respectively. As the vehicle moves through frame 28, switch 45 is actuated to maintain top brush 30 in operation after switch 44 is deactuated which stops the wash water spray. Thus, as may be seen in FIG. 2, the vehicle has its hood, front windows and roof, washed by top brush 30, and the front end of the vehicle is engaged by front brush 92. As previously explained, the strands of front brush 92 will extend substantially horizontally during rotation, and front brush 92 initially engages the front end of the vehicle so as to wash a portion of the left side thereof.

Figure 3:
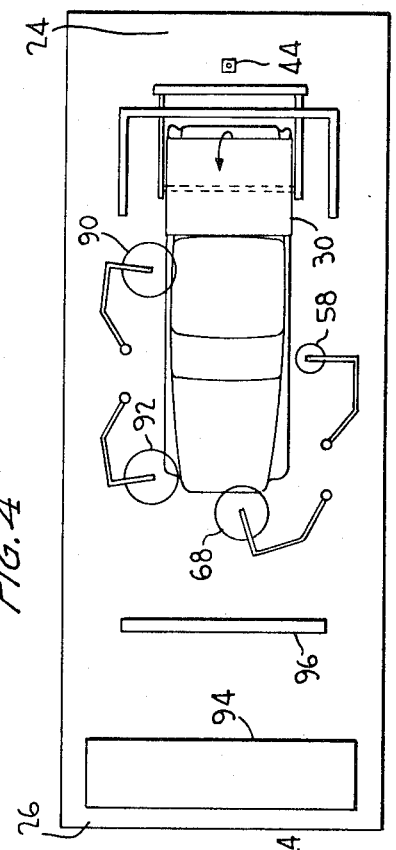
Figure 2:
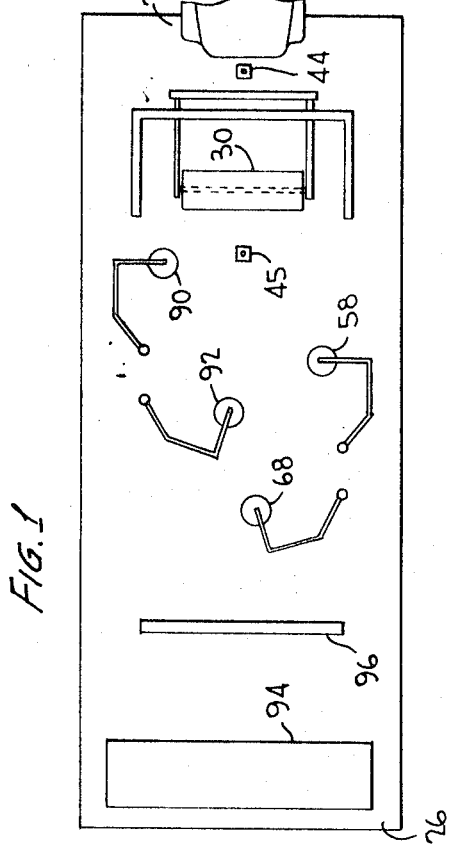

Front brush 92 is pivoted clockwise about side member 52 as the vehicle is moved through the installation such that front brush 42 moves across the right side of the front end of the vehicle. Hinges 76' permit movement of clevis 70' relative to horizontal members 72' and 74' against the force of spring 78' to prevent damage to the front brush if any of the strands get caught. As is illustrated in FIG. 3, once front brush 92 reaches the right front corner of the vehicle, switch 88' is actuated by movement of horizontal member 72' clockwise about side member 52, and actuation of switch 88' starts motor 66' to rotate rear brush 90 and actuates cylinder 81' to move rear brush 90 against the side of the vehicle. Front brush 92 will not be moved sufficiently to actuate switch 88' until rear brush 90 is adjacent the front right door of the vehicle such that rear brush 90 in no way interferes with hood obstructions, such as antennas. As previously mentioned, the vertical dimension of rear brush 90 is greater than the vertical dimension of front brush 92, and the initial rotating engagement of rear brush 90 on the side of the vehicle past the hood portion thereof permits complete washing of the vehicle without undue interference with antennas.

Figure 4:
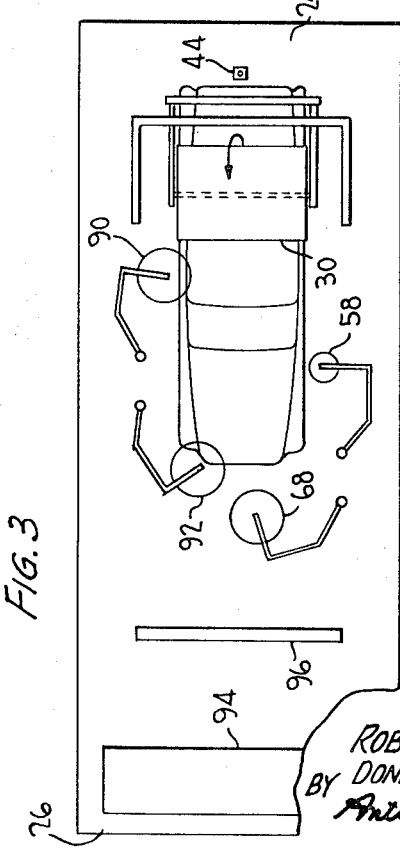

As the vehicle continues through the installation, front brush 68 will be engaged in the same manner as front brush 92 by the front end of the vehicle, as illustrated in FIG. 4. Rear brush 90 continues to wash the sides of the vehicle, and front brush 92 is moved to a position to begin washing the sides of the vehicle following rear brush 90.

As illustrated in FIG. 5, once front brush 68 is pivoted a predetermined distance about side member 56, switch 88 is actuated to start motor 66 and to actuate cylinder 81 to bring rear brush 58 into rotating contact with the side of the vehicle in the same manner as previously mentioned with respect to rear brush 90. Rear brush 58 engages the vehicle at a position adjacent the front left door so as to avoid any antennas extending along the hood portion of the vehicle and washes the sides of the vehicle in the same manner as rear brush 90. Actuation of switch 88 is also operative to supply rinse water and wax to arch 96, to energize dryer 94 and to start a timer, not shown.

The completed washing of the front end of the vehicle and the continued washing of the sides thereof are illustrated in FIGS. 6 and 7, and it will be appreciated that front brushes 68 and 92 have washed an overlapping area of the front end of the vehicle to assure that there are no areas unwashed.

Switch 45 is deactuated once the vehicle moves over the same, as illustrated in FIG. 8, to deenergize motor 36 to stop rotation of top brush 30 and to return the top brush to its park position by means of cylinder 40. At this time rear brush 90 is beginning to wash the rear end of the vehicle under pressure from cylinder 81, and the front end of the vehicle is being rinsed and waxed by the spray from arch 96.

Figure 9:
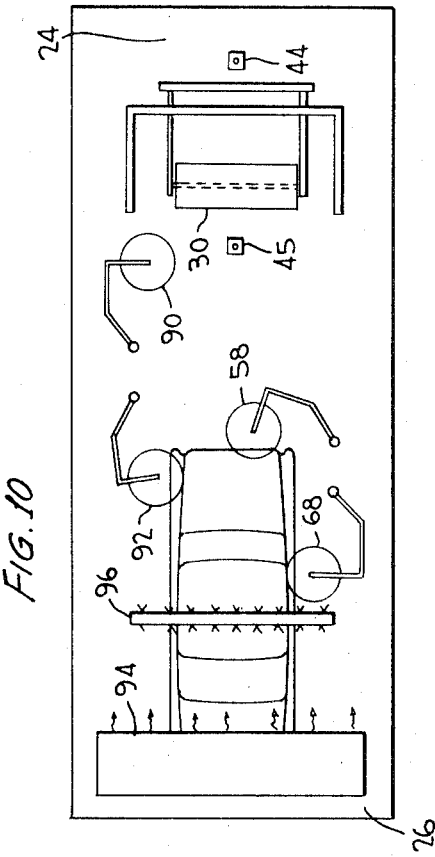
Figure 10:
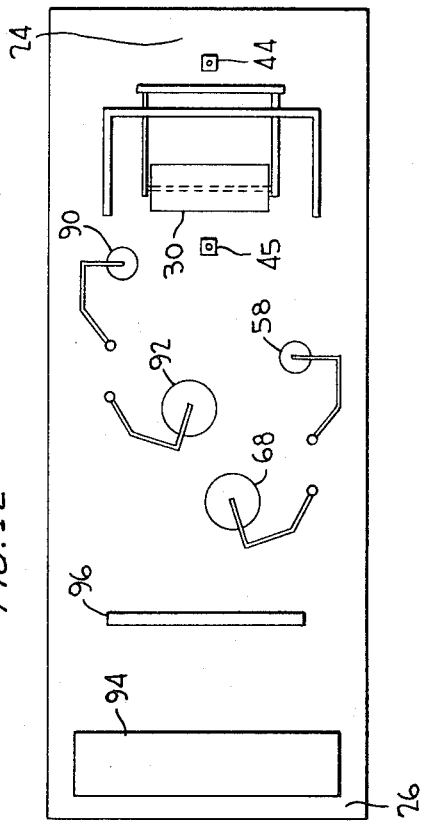

In FIG. 9, it may be seen that with continued movement of the vehicle, rear brush 90 washes the entire right rear end of the vehicle and part of the left rear end; and once the support for rear brush 90 is fully extended, a limit switch is actuated to return rear brush 90 to its park position without stopping the rotation thereof, as illustrated in FIG. 10. The return of rear brush 90 to its park position also operates the acceptor device to permit the next vehicle to enter the installation once proper money is inserted in the device.

Figure 11:
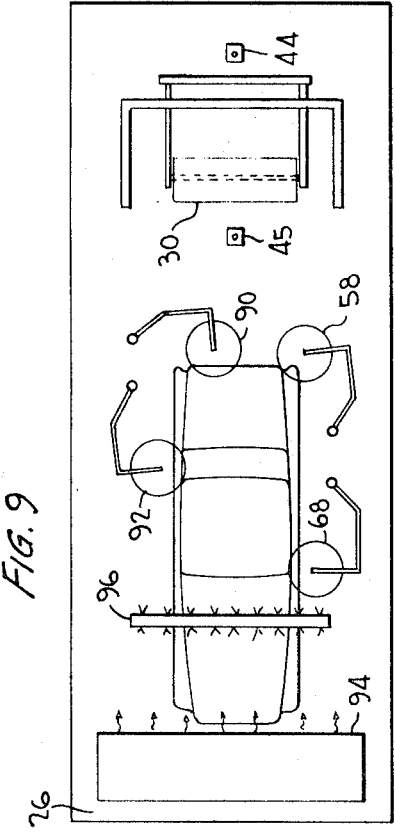
Figure 12:
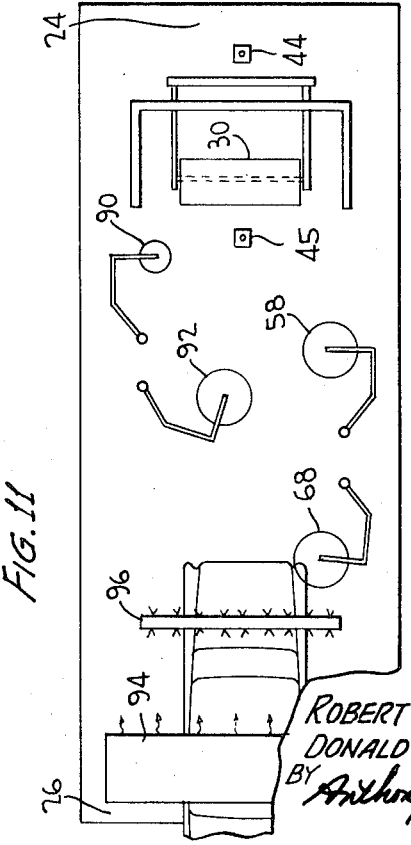

In similar fashion, rear brush 58 washes slightly more than half of the left rear end of the vehicle and is returned to its park position, as illustrated in FIG. 11. Once the vehicle has moved completely past each front brush it returns to its initial park position but is maintained in rotation as illustrated in FIG. 12 while awaiting succeeding vehicles to be washed.

As front brushes 68 and 92 are returned to their initial positions, switches 88 and 88' are released to deenergize motors 66 and 66' to stop the rotation of rear brushes 58 and 90 such that the rear brushes are normally not rotating in their park positions to prevent interference with the movement of a next vehicle to be washed thereby, and when switch 88 is released the spray from arch 96 will also be stopped. Front brushes 68 and 92 will continue to rotate and dryer 94 will continue in operation until a pre-set time or the timer has elapsed at which time the installation will return to the state illustrated in FIG. 1. If a succeeding vehicle follows within the reset time, the timer will be reset by actuation of switch 88.

While the present invention has been described with respect to movement of the vehicle to be washed past the brushes, it will be appreciated that the present invention can be utilized with other types of installations such as those where the brushes move past a stationary vehicle to be washed.

Thus, it may be seen that the vehicle washing installation of the present invention provides automated washing by front and rear brushes under pressure and permits the use of brushes having large vertical dimensions without interference with antennas. Control circuitry may be provided for the present invention in any conventional manner and has not been described in detail herein since it is of simple design within ordinary skills of those in the vehicle washing industry.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a vehicle washing installation, the combination comprising means for moving a vehicle to be washed along a longitudinal path of travel from an entrance to an exit of said installation;

a first rear brush pivotally supported on a first side of said path of travel and having a park position out of said path of travel;

a second rear brush pivotally supported on a second side of said path of travel and having a park position out of said path of travel;

said first and second rear brushes being normally not rotating in said park positions;

a first front brush pivotally supported on said first side of said path of travel and having a park position in said path of travel;

a second front brush pivotally supported on said second side of said path of travel and having a park position in said path of travel;

said first and second front brushes being disposed in longitudinal juxtaposition in said park positions and being pivotable toward said first and second sides of said path of travel, respectively, with movement of the vehicle such that a central portion of the front end of the vehicle is washed by both said first and second front brushes;

said first and second rear brushes being disposed closer to the entrance of said installation than are said first and second front brushes;

said first and second rear brushes having a vertical dimension greater than the vertical dimension of said first and second front brushes;

said first and second rear brushes being vertically mounted on first and second support arms longitudinally staggered along said path of travel such that said first rear brush is closer to the entrance of said installation than is said second rear brush; and control means responsive to pivoting movement of said first and second front brushes toward said first and second sides, respectively, of said path of travel as said vehicle moves from the entrance to the exit of said installation to start rotation of said first and second rear brushes, respectively, and to move said first and second rear brushes, respectively, to engage the sides of the vehicle whereby said first and second rear brushes each engage and wash only a portion of a side of the vehicle.

2. The invention as recited in claim 1 wherein said first and second front brushes are vertically mounted on third and fourth support arms, respectively, and each of said third and fourth support arms includes a pair of pivotally mounted, parallel, horizontal members, a clevis hingedly connected with said members and carrying said front brushes, and a spring biasing said clevis toward said horizontal members and further comprising an inverted U-shaped frame diagonally disposed across said path of travel and including first and second side columns longitudinally staggered on said first and second sides of said path of travel, said first and third support arms being pivotally mounted on said first side column and extending in opposite directions therefrom and said second and fourth support arms being pivotally mounted on said second side column and extending in opposite directions therefrom.

3. The invention as recited in claim 2 wherein said first and second rear brushes are controlled by first and second air cylinders secured to said first and second side columns, respectively, said first and second air cylinders pivoting said first and second rear brushes into said path of travel whereby said first and second rear brushes pivot to wash the rear end of the vehicle.

4. In a vehicle washing installation, the combination comprising
- means for moving a vehicle to be washed along a longitudinal path of travel from an entrance to an exit of said installation;
- a first rear brush pivotally supported on a first side of said path of travel and having a park position out of said path of travel;
- a second rear brush pivotally supporged on a second side of said path of travel and having a park position out of said path of travel;
- said first and second rear brushes being supported in staggered longitudinal positions on said first and second sides of said path of travel;
- said first and second rear brushes being normally not rotating in said park positions;
- a first front brush pivotally supported on said first side of said path of travel and having a park position in said path of travel;
- a second front brush pivotally supported on said second side of said path of travel and having a park position in said path of travel;
- said first and second front brushes being disposed in longitudinal juxtaposition in said park positions and being pivotable toward said first and second sides of said path of travel, respectively, with movement of the vehicle such that a central portion of the front end of the vehicle is washed by both said first and second front brushes;
- each of said first and second rear brushes having a vertical dimension greater than the vertical dimension of each of said first and second rear brushes, respectively;
- a frame extending diagonally across said path of travel and having first and second side columns;
- said first front brush and said first rear brush being pivotally mounted on said first side column of said frame, and said second front brush and said second rear brush being pivotally mounted on said second side column of said frame;
- first air cylinder means secured to said first side column to pivot said first front brush and said first rear brush in opposite directions;
- second air cylinder means secured to said second side column to pivot said second front brush and said second rear brush in opposite directions;
- first control means secured to said first side column of said frame and responsive to movement of said first front brush to start rotation of said first rear brush and to actuate said first air cylinder means to force said first rear brush against a side of the vehicle adjacent a front edge of a front door thereof; and
- second control means secured to said second side column of said frame and responsive to movement of said second front brush to start rotation of said second rear brush and to actuate said second air cylinder means to force said second rear brush against the other side of the vehicle adjacent a front edge of a front door thereof whereby said first and second front brushes wash the front end and sides of the vehicle and said first and second rear brushes wash the rear end, a portion of the sides and the side windows of the vehicle.

5. The invention as recited in claim 4 wherein said first and second rear brushes are vertically mounted on first and second support arms, respectively, said first and second front brushes are vertically mounted on third and fourth support arms, respectively, said first and third support arms are pivotally mounted on said first side column of said frame and extend in opposite directions therefrom, and said second and fourth support arms are pivotally mounted on said second side column of said frame and extend in opposite directions therefrom, each of said third and fourth support arms including a pair of pivotally mounted, parallel, horizontal members, a clevis hingedly connected with said members and carrying a respective one of said front brushes, and a spring biasing said clevis toward said horizontal members.

6. The invention as recited in claim 1 wherein said control means is further responsive to said first and second front brushes returning to said park positions to stop rotation of said first and second rear brushes.

7. The invention as recited in claim 4 wherein said first control means is further responsive to said first front brush returning to said park position to stop rotation of said first rear brush, and said second control means is further responsive to said second front brush returning to said park position to stop rotation of said second rear brush.

* * * * *